US007674753B2

(12) United States Patent
Munoz, Jr. et al.

(10) Patent No.: US 7,674,753 B2
(45) Date of Patent: *Mar. 9, 2010

(54) TREATMENT FLUIDS AND METHODS OF FORMING DEGRADABLE FILTER CAKES COMPRISING ALIPHATIC POLYESTER AND THEIR USE IN SUBTERRANEAN FORMATIONS

(75) Inventors: Trinidad Munoz, Jr., Duncan, OK (US); Larry S. Eoff, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 499 days.

This patent is subject to a terminal disclaimer.

(21) Appl. No.: 11/634,320

(22) Filed: Dec. 5, 2006

(65) Prior Publication Data

US 2007/0078064 A1    Apr. 5, 2007

Related U.S. Application Data

(63) Continuation-in-part of application No. 10/832,163, filed on Apr. 26, 2004, now abandoned, and a continuation-in-part of application No. 10/664,126, filed on Sep. 17, 2003.

(51) Int. Cl.
*E21B 7/00* (2006.01)
*C09K 8/02* (2006.01)
(52) U.S. Cl. .............. 507/103; 166/278; 166/279; 166/305.1; 175/66; 175/72; 507/203; 507/260; 507/267; 507/903
(58) Field of Classification Search ............. 507/260, 507/267, 103, 203, 903; 166/278, 279, 305.1; 175/65, 72
See application file for complete search history.

(56) References Cited

U.S. PATENT DOCUMENTS

| | | | |
|---|---|---|---|
| 2,238,671 A | 4/1941 | Woodhouse | 166/21 |
| 2,703,316 A | 3/1955 | Palmer | 260/78.3 |
| 3,173,484 A | 3/1965 | Huitt et al. | 166/280.1 |
| 3,195,635 A | 7/1965 | Fast | 166/280.1 |
| 3,272,650 A | 9/1966 | MacVittie | 134/7 |
| 3,302,719 A | 2/1967 | Fischer | 166/280.2 |
| 3,364,995 A | 1/1968 | Atkins et al. | 166/280.1 |
| 3,366,178 A | 1/1968 | Malone et al. | 166/280.1 |
| 3,455,390 A | 7/1969 | Gallus | 166/295 |
| 3,784,585 A | 1/1974 | Schmitt et al. | 260/861 |
| 3,819,525 A | 6/1974 | Hattenbrun | 252/132 |
| 3,828,854 A | 8/1974 | Templeton et al. | 166/307 |
| 3,836,465 A | 9/1974 | Rhudy et al. | |
| 3,868,998 A | 3/1975 | Lybarger et al. | 166/278 |
| 3,912,692 A | 10/1975 | Casey et al. | 260/78.3 |
| 3,948,672 A | 4/1976 | Harnsberger | 106/90 |
| 3,955,993 A | 5/1976 | Curtice | 106/90 |
| 3,960,736 A | 6/1976 | Free et al. | 252/8.55 |
| 3,968,840 A | 7/1976 | Tate | 166/280.1 |
| 3,986,355 A | 10/1976 | Klaeger | |
| 3,998,272 A | 12/1976 | Maly | 166/281 |
| 3,998,744 A | 12/1976 | Arnold et al. | 507/269 |
| 4,010,071 A | 3/1977 | Colegrove | |
| 4,068,718 A | 1/1978 | Cooke, Jr. et al. | 166/280.2 |
| 4,169,798 A | 10/1979 | DeMartino | 252/8.55 R |
| 4,172,066 A | 10/1979 | Zweigle et al. | 260/29.6 TA |
| 4,261,421 A | 4/1981 | Watanabe | 166/281 |
| 4,265,673 A | 5/1981 | Pace et al. | |
| 4,299,825 A | 11/1981 | Lee | |
| 4,387,769 A | 6/1983 | Erbstoesser et al. | 166/295 |
| 4,460,052 A | 7/1984 | Gockel | 175/72 |
| 4,470,915 A | 9/1984 | Conway | 252/8.55 R |
| 4,498,995 A | 2/1985 | Gockel | 252/8.5 LC |
| 4,502,540 A | 3/1985 | Byham | |
| 4,506,734 A | 3/1985 | Nolte | |
| 4,521,316 A | 6/1985 | Sikorski | |

(Continued)

FOREIGN PATENT DOCUMENTS

EP    0 510 762 A2    10/1992

(Continued)

OTHER PUBLICATIONS

Kiyoshi Matsuyama et al, Environmentally benign formation of polymeric microspheres by rapid expansion of supercritical carbon dioxide solution with a nonsolvent, Environ Sci Technol 2001, 35, 4149-4155.

(Continued)

*Primary Examiner*—Timothy J. Kugel
(74) *Attorney, Agent, or Firm*—Robert A. Kent; Baker Botts LLP

(57) ABSTRACT

Presented herein are improved bridging agents comprising a degradable material, improved subterranean treatment fluids comprising such improved bridging agents, and methods of using such improved subterranean treatment fluids in subterranean formations. An example of a method presented is a method of drilling a well bore in a subterranean formation. Another example of a method presented is a method of forming a self-degrading filter cake in a subterranean formation. Another example of a method presented is a method of degrading a filter cake in a subterranean formation. An example of a composition of the present invention is a treatment fluid including a viscosifier, a fluid loss control additive, and a bridging agent comprising a degradable material. Another example of a composition presented is a bridging agent comprising a degradable material.

20 Claims, No Drawings

U.S. PATENT DOCUMENTS

| | | | |
|---|---|---|---|
| 4,526,695 A | 7/1985 | Erbstoesser et al. | 252/8.55 R |
| 4,632,876 A | 12/1986 | Laird et al. | |
| 4,694,905 A | 9/1987 | Armbruster | 166/280 |
| 4,715,967 A | 12/1987 | Bellis | 252/8.551 |
| 4,716,964 A | 1/1988 | Erbstoesser et al. | 166/284 |
| 4,767,706 A | 8/1988 | Levesque | |
| 4,772,346 A | 9/1988 | Anderson et al. | |
| 4,785,884 A | 11/1988 | Armbruster | 166/280 |
| 4,793,416 A | 12/1988 | Mitchell | |
| 4,797,262 A | 1/1989 | Dewitz | 422/142 |
| 4,809,783 A | 3/1989 | Hollenbeck et al. | 166/307 |
| 4,817,721 A | 4/1989 | Pober | 166/295 |
| 4,822,500 A | 4/1989 | Dobson, Jr. et al. | |
| 4,829,100 A | 5/1989 | Murphey et al. | |
| 4,836,940 A | 6/1989 | Alexander | |
| 4,843,118 A | 6/1989 | Lai et al. | 524/555 |
| 4,848,467 A | 7/1989 | Cantu et al. | 166/281 |
| 4,863,980 A | 9/1989 | Cowan et al. | |
| 4,886,354 A | 12/1989 | Welch et al. | 356/70 |
| 4,894,231 A | 1/1990 | Moreau et al. | |
| 4,957,165 A | 9/1990 | Cantu et al. | 166/295 |
| 4,961,466 A | 10/1990 | Himes et al. | 166/250 |
| 4,986,353 A | 1/1991 | Clark et al. | 166/279 |
| 4,986,354 A | 1/1991 | Cantu et al. | 166/279 |
| 4,986,355 A | 1/1991 | Casad et al. | 166/295 |
| 5,034,139 A | 7/1991 | Reid et al. | |
| 5,082,056 A | 1/1992 | Tackett, Jr. | 166/295 |
| 5,142,023 A | 8/1992 | Gruber et al. | 528/354 |
| 5,152,781 A | 10/1992 | Tang et al. | |
| 5,161,615 A | 11/1992 | Hutchins et al. | |
| 5,203,834 A | 4/1993 | Hutchins et al. | |
| 5,213,446 A | 5/1993 | Dovan | |
| 5,216,050 A | 6/1993 | Sinclair | 524/108 |
| 5,247,059 A | 9/1993 | Gruber et al. | 528/354 |
| 5,249,628 A | 10/1993 | Surjaatmadja | 166/305 |
| 5,251,697 A | 10/1993 | Shuler | |
| 5,295,542 A | 3/1994 | Cole et al. | 166/278 |
| 5,304,620 A | 4/1994 | Holtmyer et al. | |
| 5,314,031 A | 5/1994 | Hale et al. | |
| 5,325,923 A | 7/1994 | Surjaatmadja et al. | 166/308 |
| 5,330,005 A | 7/1994 | Card et al. | 166/280 |
| 5,359,026 A | 10/1994 | Gruber | 528/354 |
| 5,360,068 A | 11/1994 | Sprunt et al. | 166/259 |
| 5,363,916 A | 11/1994 | Himes et al. | 166/276 |
| 5,373,901 A | 12/1994 | Norman et al. | 166/300 |
| 5,386,874 A | 2/1995 | Laramay et al. | 166/300 |
| 5,396,957 A | 3/1995 | Surjaatmadja et al. | 166/308 |
| 5,402,846 A | 4/1995 | Jennings, Jr. et al. | 166/259 |
| 5,439,055 A | 8/1995 | Card et al. | 166/280 |
| 5,460,226 A | 10/1995 | Lawton et al. | 166/300 |
| 5,464,060 A | 11/1995 | Hale et al. | 166/293 |
| 5,475,080 A | 12/1995 | Gruber et al. | 528/354 |
| 5,484,881 A | 1/1996 | Gruber et al. | 528/354 |
| 5,487,897 A | 1/1996 | Polson et al. | |
| 5,492,177 A | 2/1996 | Yeh et al. | |
| 5,496,557 A | 3/1996 | Feijen et al. | |
| 5,497,830 A | 3/1996 | Boles et al. | 166/300 |
| 5,499,678 A | 3/1996 | Surjaatmadja et al. | 166/298 |
| 5,501,276 A | 3/1996 | Weaver et al. | |
| 5,505,787 A | 4/1996 | Yamaguchi | 134/4 |
| 5,512,071 A | 4/1996 | Yam et al. | 51/307 |
| 5,536,807 A | 7/1996 | Gruber et al. | 528/354 |
| 5,555,936 A | 9/1996 | Pirri et al. | |
| 5,591,700 A | 1/1997 | Harris et al. | 507/204 |
| 5,594,095 A | 1/1997 | Gruber et al. | 528/354 |
| 5,602,083 A | 2/1997 | Gabrysch et al. | |
| 5,604,186 A | 2/1997 | Hunt et al. | 507/204 |
| 5,607,905 A | 3/1997 | Dobson, Jr. et al. | 507/211 |
| 5,613,558 A | 3/1997 | Dillenbeck | |
| 5,670,473 A | 9/1997 | Scepanski | 510/445 |
| 5,697,440 A | 12/1997 | Weaver et al. | |
| 5,698,322 A | 12/1997 | Tsai et al. | 428/373 |
| 5,723,416 A | 3/1998 | Liao | |
| 5,765,642 A | 6/1998 | Surjaatmadja | 166/297 |
| 5,783,527 A | 7/1998 | Dobson, Jr. et al. | |
| 5,791,415 A | 8/1998 | Nguyen et al. | 166/280 |
| 5,799,734 A | 9/1998 | Norman et al. | |
| 5,833,000 A | 11/1998 | Weaver et al. | 166/276 |
| 5,849,401 A | 12/1998 | El-Afandi et al. | 428/215 |
| 5,853,048 A | 12/1998 | Weaver et al. | 166/279 |
| 5,888,944 A * | 3/1999 | Patel | 166/300 |
| 5,893,416 A | 4/1999 | Read | 166/304 |
| 5,908,073 A | 6/1999 | Nguyen et al. | 166/276 |
| 5,916,849 A | 6/1999 | House | |
| 5,924,488 A | 7/1999 | Nguyen et al. | 166/280 |
| 5,964,291 A | 10/1999 | Bourne et al. | 166/279 |
| 5,977,030 A | 11/1999 | House | |
| 5,979,557 A | 11/1999 | Card et al. | |
| 5,981,447 A | 11/1999 | Chang et al. | |
| 5,996,693 A | 12/1999 | Heathman | |
| 6,004,400 A | 12/1999 | Bishop et al. | 134/2 |
| 6,024,170 A | 2/2000 | McCabe et al. | 166/300 |
| 6,028,113 A | 2/2000 | Scepanski | 514/643 |
| 6,047,772 A | 4/2000 | Weaver et al. | 166/276 |
| 6,110,875 A | 8/2000 | Tjon-Joe-Pin et al. | |
| 6,114,410 A | 9/2000 | Betzold | 523/130 |
| 6,123,159 A | 9/2000 | Brookey et al. | |
| 6,123,965 A | 9/2000 | Jacob et al. | 424/489 |
| 6,131,661 A | 10/2000 | Conner et al. | 166/300 |
| 6,135,987 A | 10/2000 | Tsai et al. | 604/365 |
| 6,143,698 A | 11/2000 | Murphey et al. | 507/145 |
| 6,148,917 A | 11/2000 | Brookey et al. | |
| 6,162,766 A | 12/2000 | Muir et al. | 507/267 |
| 6,169,058 B1 | 1/2001 | Le et al. | 507/222 |
| 6,172,011 B1 | 1/2001 | Card et al. | 507/204 |
| 6,189,615 B1 | 2/2001 | Sydansk | 166/270 |
| 6,202,751 B1 | 3/2001 | Chatterji et al. | 166/276 |
| 6,209,643 B1 | 4/2001 | Nguyen et al. | 166/276 |
| 6,209,646 B1 | 4/2001 | Reddy et al. | 166/300 |
| 6,214,773 B1 | 4/2001 | Harris et al. | |
| 6,242,390 B1 | 6/2001 | Mitchell et al. | 507/211 |
| 6,258,755 B1 | 7/2001 | House et al. | |
| 6,260,622 B1 | 7/2001 | Blok et al. | 166/305.1 |
| 6,291,013 B1 | 9/2001 | Gibson et al. | 427/213.3 |
| 6,300,286 B1 | 10/2001 | Dobson, Jr. et al. | |
| 6,302,209 B1 | 10/2001 | Thompson et al. | |
| 6,308,788 B1 | 10/2001 | Patel et al. | |
| 6,311,773 B1 | 11/2001 | Todd et al. | 166/280 |
| 6,323,307 B1 | 11/2001 | Bigg et al. | 528/354 |
| 6,326,458 B1 | 12/2001 | Gruber et al. | 528/354 |
| 6,328,105 B1 | 12/2001 | Betzold | 166/280 |
| 6,330,917 B2 | 12/2001 | Chatterji et al. | |
| 6,357,527 B1 | 3/2002 | Norman et al. | 166/300 |
| 6,364,945 B1 | 4/2002 | Chatterji et al. | 106/677 |
| 6,380,138 B1 | 4/2002 | Ischy et al. | 507/204 |
| 6,387,986 B1 | 5/2002 | Moradi-Araghi et al. | 523/211 |
| 6,390,195 B1 | 5/2002 | Nguyen et al. | 166/276 |
| 6,394,185 B1 | 5/2002 | Constien | 166/296 |
| 6,422,314 B1 | 7/2002 | Todd et al. | 166/312 |
| 6,422,326 B1 | 7/2002 | Brookey et al. | |
| 6,432,155 B1 | 8/2002 | Swazey et al. | |
| 6,454,003 B1 | 9/2002 | Chang et al. | 166/270 |
| 6,485,947 B1 | 11/2002 | Rajgarhia et al. | 435/139 |
| 6,488,763 B2 | 12/2002 | Brothers et al. | 106/692 |
| 6,494,263 B2 | 12/2002 | Todd | 166/312 |
| 6,508,305 B1 | 1/2003 | Brannon et al. | 166/293 |
| 6,509,301 B1 | 1/2003 | Vollmer et al. | 507/236 |
| 6,527,051 B1 | 3/2003 | Reddy et al. | 166/300 |
| 6,554,071 B1 | 4/2003 | Reddy et al. | 166/293 |
| 6,566,310 B2 | 5/2003 | Chan | |
| 6,569,814 B1 | 5/2003 | Brady et al. | 507/201 |
| 6,578,630 B2 | 6/2003 | Simpson et al. | |
| 6,586,372 B1 | 7/2003 | Bradbury et al. | |
| 6,599,863 B1 | 7/2003 | Palmer et al. | 507/219 |

| | | | | | | |
|---|---|---|---|---|---|---|
| 6,667,279 B1 | 12/2003 | Hessert et al. ............... 507/225 | 7,497,258 B2 | 3/2009 | Savery et al. | |
| 6,669,771 B2 | 12/2003 | Tokiwa et al. ............ 106/162.7 | 7,497,278 B2 | 3/2009 | Schriener et al. | |
| 6,681,856 B1 | 1/2004 | Chatterji et al. ............. 166/294 | 7,506,689 B2 | 3/2009 | Surjaatmadja et al. | |
| 6,686,328 B1 | 2/2004 | Binder ....................... 510/446 | 7,595,280 B2 | 9/2009 | Welton et al. | |
| 6,691,780 B2 | 2/2004 | Nguyen et al. | 7,598,208 B2 | 10/2009 | Todd | |
| 6,702,023 B1 | 3/2004 | Harris et al. ................. 166/307 | 7,608,566 B2 | 10/2009 | Saini et al. | |
| 6,702,044 B2 | 3/2004 | Reddy et al. | 7,608,567 B2 | 10/2009 | Saini | |
| 6,710,019 B1 | 3/2004 | Sawdon et al. ............. 507/136 | 2001/0016562 A1 | 8/2001 | Muir et al. ................... 507/201 | |
| 6,716,797 B2 | 4/2004 | Brookey | 2002/0036088 A1 | 3/2002 | Todd ......................... 166/300 | |
| 6,737,385 B2 | 5/2004 | Todd et al. | 2002/0119169 A1 | 8/2002 | Angel et al. | |
| 6,761,218 B2 | 7/2004 | Nguyen et al. ............. 166/278 | 2002/0125012 A1 | 9/2002 | Dawson et al. .............. 166/300 | |
| 6,763,888 B1 | 7/2004 | Harris et al. .............. 166/305.1 | 2003/0054962 A1 | 3/2003 | England et al. | |
| 6,764,981 B1 | 7/2004 | Eoff et al. | 2003/0060374 A1 | 3/2003 | Cooke, Jr. ................... 507/200 | |
| 6,793,018 B2 | 9/2004 | Dawson et al. .............. 166/300 | 2003/0114314 A1 | 6/2003 | Ballard et al. ............... 507/100 | |
| 6,793,730 B2 | 9/2004 | Reddy et al. | 2003/0130133 A1 | 7/2003 | Vollmer ...................... 507/100 | |
| 6,806,235 B1 | 10/2004 | Mueller et al. | 2003/0147965 A1 | 8/2003 | Bassett et al. | |
| 6,817,414 B2 | 11/2004 | Lee ............................. 166/278 | 2003/0188766 A1 | 10/2003 | Banerjee et al. ................. 134/7 | |
| 6,818,594 B1 | 11/2004 | Freeman et al. | 2003/0230407 A1 | 12/2003 | Vijn et al. | |
| 6,837,309 B2 | 1/2005 | Boney et al. ............. 166/280.2 | 2003/0234103 A1 | 12/2003 | Lee et al. ..................... 166/293 | |
| 6,883,608 B2 | 4/2005 | Parlar et al. | 2004/0014606 A1 | 1/2004 | Parlar et al. | |
| 6,896,058 B2 | 5/2005 | Munoz, Jr. et al. .......... 166/279 | 2004/0014607 A1 | 1/2004 | Sinclair et al. .............. 507/200 | |
| 6,904,971 B2 | 6/2005 | Brothers et al. | 2004/0040706 A1 | 3/2004 | Hossaini et al. ............. 166/278 | |
| 6,949,491 B2 | 9/2005 | Cooke, Jr. ................... 507/219 | 2004/0055747 A1 | 3/2004 | Lee ............................. 166/278 | |
| 6,959,767 B2 | 11/2005 | Horton et al. | 2004/0070093 A1 | 4/2004 | Mathiowitz et al. | |
| 6,978,838 B2 | 12/2005 | Parlar et al. | 2004/0094300 A1 | 5/2004 | Sullivan et al. ........... 166/308.1 | |
| 6,981,552 B2 | 1/2006 | Reddy et al. | 2004/0099416 A1 | 5/2004 | Vijn et al. | |
| 6,983,801 B2 | 1/2006 | Dawson et al. .............. 166/300 | 2004/0106525 A1 | 6/2004 | Willbert et al. ............. 507/200 | |
| 6,987,083 B2 | 1/2006 | Phillippi et al. | 2004/0138068 A1 | 7/2004 | Rimmer et al. ............. 507/100 | |
| 6,997,259 B2 | 2/2006 | Nguyen | 2004/0152601 A1 | 8/2004 | Still et al. ................... 507/100 | |
| 7,007,752 B2 | 3/2006 | Reddy et al. | 2004/0152602 A1 | 8/2004 | Boles ......................... 507/100 | |
| 7,021,377 B2 | 4/2006 | Todd et al. | 2004/0162386 A1 | 8/2004 | Altes et al. .................. 524/806 | |
| 7,032,663 B2 | 4/2006 | Nguyen ...................... 166/276 | 2004/0170836 A1 | 9/2004 | Bond et al. | |
| 7,033,976 B2 | 4/2006 | Guzman | 2004/0214724 A1 | 10/2004 | Todd et al. | |
| 7,036,586 B2 | 5/2006 | Roddy et al. | 2004/0216876 A1 | 11/2004 | Lee ......................... 166/280.1 | |
| 7,036,587 B2 | 5/2006 | Munoz, Jr. et al. .......... 166/279 | 2004/0231845 A1 | 11/2004 | Cooke, Jr. ................... 166/279 | |
| 7,044,220 B2 | 5/2006 | Nguyen et al. .............. 166/279 | 2004/0261993 A1 | 12/2004 | Nguyen ...................... 166/276 | |
| 7,044,224 B2 | 5/2006 | Nguyen ...................... 166/292 | 2004/0261995 A1 | 12/2004 | Nguyen et al. .............. 166/279 | |
| 7,063,151 B2 | 6/2006 | Nguyen et al. | 2004/0261996 A1 | 12/2004 | Munoz, Jr. et al. .......... 166/279 | |
| 7,066,258 B2 | 6/2006 | Justus et al. ................. 166/295 | 2004/0261999 A1 | 12/2004 | Nguyen ...................... 166/292 | |
| 7,069,994 B2 | 7/2006 | Cooke, Jr. | 2005/0006095 A1 | 1/2005 | Justus et al. ................. 166/295 | |
| 7,080,688 B2 | 7/2006 | Todd et al. ................... 166/278 | 2005/0028976 A1 | 2/2005 | Nguyen | |
| 7,093,664 B2 | 8/2006 | Todd et al. | 2005/0034861 A1 | 2/2005 | Saini et al. .................. 166/278 | |
| 7,096,947 B2 | 8/2006 | Todd et al. | 2005/0034865 A1 | 2/2005 | Todd et al. .................. 166/304 | |
| 7,101,829 B2 | 9/2006 | Guichard et al. | 2005/0034867 A1 | 2/2005 | Frost et al. .................. 166/307 | |
| 7,131,491 B2 | 11/2006 | Blauch et al. | 2005/0045328 A1 | 3/2005 | Frost et al. .................. 166/278 | |
| 7,140,438 B2 | 11/2006 | Frost et al. | 2005/0051330 A1 | 3/2005 | Nguyen ...................... 166/276 | |
| 7,147,067 B2 | 12/2006 | Getzalf et al. | 2005/0056423 A1 | 3/2005 | Todd et al. .................. 166/278 | |
| 7,151,077 B2 | 12/2006 | Prud'homme et al. | 2005/0059556 A1 | 3/2005 | Munoz, Jr. et al. .......... 507/103 | |
| 7,156,174 B2 | 1/2007 | Roddy et al. | 2005/0059557 A1 | 3/2005 | Todd et al. .................. 507/110 | |
| 7,165,617 B2 | 1/2007 | Lord et al. | 2005/0059558 A1 | 3/2005 | Blauch et al. ............... 507/203 | |
| 7,168,489 B2 | 1/2007 | Frost et al. | 2005/0103496 A1 | 5/2005 | Todd et al. .................. 166/278 | |
| 7,172,022 B2 | 2/2007 | Reddy et al. | 2005/0126780 A1 | 6/2005 | Todd et al. .................. 166/280 | |
| 7,178,596 B2 | 2/2007 | Blauch et al. ................ 166/280 | 2005/0126785 A1 | 6/2005 | Todd .......................... 166/307 | |
| 7,195,068 B2 | 3/2007 | Todd | 2005/0130848 A1 | 6/2005 | Todd et al. .................. 166/276 | |
| 7,204,312 B2 | 4/2007 | Roddy et al. | 2005/0161220 A1 | 7/2005 | Todd et al. .................. 166/283 | |
| 7,219,731 B2 | 5/2007 | Sullivan et al. ............. 166/278 | 2005/0167104 A1 | 8/2005 | Roddy et al. ................ 166/279 | |
| 7,228,904 B2 | 6/2007 | Todd et al. | 2005/0167105 A1 | 8/2005 | Roddy et al. ................ 166/293 | |
| 7,256,159 B2 | 8/2007 | Guichard et al. | 2005/0167107 A1 | 8/2005 | Roddy et al. ................ 166/277 | |
| 7,261,156 B2 | 8/2007 | Nguyen et al. | 2005/0183741 A1 | 8/2005 | Surjaatmadja et al. | |
| 7,264,051 B2 | 9/2007 | Nguyen et al. | 2005/0205258 A1 | 9/2005 | Reddy et al. ................ 166/292 | |
| 7,267,170 B2 | 9/2007 | Mang et al. | 2005/0205265 A1 | 9/2005 | Todd et al. .................. 166/376 | |
| 7,299,876 B2 | 11/2007 | Lord et al. | 2005/0205266 A1 | 9/2005 | Todd et al. | |
| 7,303,014 B2 | 12/2007 | Reddy et al. | 2005/0252659 A1 | 11/2005 | Sullivan et al. .......... 166/280.1 | |
| 7,306,037 B2 | 12/2007 | Nguyen et al. | 2005/0272613 A1 | 12/2005 | Cooke, Jr. | |
| 7,322,412 B2 | 1/2008 | Badalamenti et al. | 2005/0277554 A1 | 12/2005 | Blauch et al. | |
| 7,353,876 B2 | 4/2008 | Savery et al. | 2006/0016596 A1 | 1/2006 | Pauls et al. | |
| 7,353,879 B2 | 4/2008 | Todd et al. | 2006/0032633 A1 | 2/2006 | Nguyen | |
| 7,413,017 B2 | 8/2008 | Nguyen et al. | 2006/0046938 A1 | 3/2006 | Harris et al. | |
| 7,448,450 B2 | 11/2008 | Luke et al. | 2006/0048938 A1 | 3/2006 | Kalman | |
| 7,455,112 B2 | 11/2008 | Moorehead et al. | 2006/0065397 A1 | 3/2006 | Nguyen et al. | |
| 7,461,697 B2 | 12/2008 | Todd et al. | 2006/0105917 A1 | 5/2006 | Munoz, Jr. ................. 507/103 | |
| 7,475,728 B2 | 1/2009 | Pauls et al. | 2006/0105918 A1 | 5/2006 | Munoz, Jr. et al. | |
| 7,484,564 B2 | 2/2009 | Welton et al. | 2006/0108150 A1 | 5/2006 | Luke et al. | |

| | | | |
|---|---|---|---|
| 2006/0169182 A1 | 8/2006 | Todd et al. | |
| 2006/0169448 A1 | 8/2006 | Savery et al. | |
| 2006/0169450 A1 | 8/2006 | Mang et al. | |
| 2006/0169452 A1 | 8/2006 | Savery et al. | |
| 2006/0169453 A1 | 8/2006 | Savery et al. | |
| 2006/0172893 A1 | 8/2006 | Todd et al. | |
| 2006/0172894 A1 | 8/2006 | Mang et al. | |
| 2006/0172895 A1 | 8/2006 | Mang et al. | |
| 2006/0185847 A1 | 8/2006 | Saini et al. | |
| 2006/0185848 A1 | 8/2006 | Surjaatmadja et al. | |
| 2006/0205608 A1 | 9/2006 | Todd | |
| 2006/0234873 A1 | 10/2006 | Ballard | |
| 2006/0243449 A1 | 11/2006 | Welton et al. | |
| 2006/0247135 A1 | 11/2006 | Welton et al. | |
| 2006/0254774 A1 | 11/2006 | Saini et al. | |
| 2006/0258543 A1 | 11/2006 | Saini | |
| 2006/0258544 A1 | 11/2006 | Saini | |
| 2006/0276345 A1 | 12/2006 | Todd et al. | |
| 2006/0283597 A1 | 12/2006 | Schriener et al. | 166/300 |
| 2007/0042912 A1 | 2/2007 | Welton et al. | |
| 2007/0049501 A1 | 3/2007 | Saini et al. | |
| 2007/0066492 A1 | 3/2007 | Funkhouser et al. | |
| 2007/0066493 A1 | 3/2007 | Funkhouser et al. | |
| 2007/0078063 A1 | 4/2007 | Munoz, Jr. | |
| 2007/0238623 A1 | 10/2007 | Saini et al. | |
| 2007/0281868 A1 | 12/2007 | Pauls et al. | |
| 2008/0026955 A1 | 1/2008 | Munoz et al. | |
| 2008/0026959 A1 | 1/2008 | Munoz et al. | |
| 2008/0026960 A1 | 1/2008 | Munoz et al. | |
| 2008/0027157 A1 | 1/2008 | Munoz et al. | |
| 2008/0070810 A1 | 3/2008 | Mang | |
| 2008/0139415 A1 | 6/2008 | Todd et al. | |
| 2008/0169102 A1 | 7/2008 | Carbajal et al. | |
| 2009/0062157 A1 | 3/2009 | Munoz et al. | |
| 2009/0258798 A1 | 10/2009 | Munoz | |

FOREIGN PATENT DOCUMENTS

| | | |
|---|---|---|
| EP | 0 879 935 A2 | 11/1998 |
| EP | 0 879 935 A3 | 2/1999 |
| EP | 1 413 710 A1 | 4/2004 |
| GB | 2 412 389 | 3/2004 |
| JP | 2004181820 A | 7/2004 |
| WO | WO 93/15127 A1 | 8/1993 |
| WO | WO 94/07949 A1 | 4/1994 |
| WO | WO 94/08078 A1 | 4/1994 |
| WO | WO 94/08090 A1 | 4/1994 |
| WO | WO 95/09879 A1 | 4/1995 |
| WO | WO 97/11845 A1 | 4/1997 |
| WO | WO 99/27229 | 6/1999 |
| WO | WO 00/57022 | 9/2000 |
| WO | WO 01/02698 | 1/2001 |
| WO | WO 01/87797 A1 | 11/2001 |
| WO | WO 01/94744 | 12/2001 |
| WO | WO 02/55843 A1 | 1/2002 |
| WO | WO 02/12674 A1 | 2/2002 |
| WO | WO 03/027431 A2 | 4/2003 |
| WO | WO 03/027431 A3 | 4/2003 |
| WO | WO 2004/007905 | 1/2004 |
| WO | WO 2004/037946 A1 | 5/2004 |
| WO | WO 2004/038176 A1 | 5/2004 |
| WO | WO 2006/053936 A1 | 5/2006 |

OTHER PUBLICATIONS

Office Action dated Aug. 2, 2006 from U.S. Appl. No. 10/832,163.
Office Action dated Aug. 8, 2007 from U.S. Appl. No. 10/664,126.
Office Action dated Jun. 30, 2006 from U.S. Appl. No. 10/664,126.
Office Action dated Dec. 13, 2005 from U.S. Appl. No. 10/664,126.
Office Action dated Dec. 29, 2006 from U.S. Appl. No. 10/664,126.
NatureWorks Product Bulletin entitled NatureWorks PLA Polymer 3001D, Injection Molding Process Guide, 2005.
NatureWorks Product Bulletin entitled NatureWorks PLA Polymer 4060D, For Heat Seal Layer in Coextruded Oriented Films, 2005.
NatureWorks article entitled NatureWorks, Crystallizing and Drying of PLA, 2005.
Notice of Publication dated Apr. 5, 2007 from U.S. Appl. No. 11/634,319.
U.S. Appl. No. 10/650,101, filed Aug. 26, 2003, Todd, et al.
U.S. Appl. No. 10/864,061, filed Jun. 9, 2004, Blauch, et al.
U.S. Appl. No. 10/864,618, filed Jun. 9, 2004, Blauch, et al.
U.S. Appl. No. 10/897,509, filed Jul. 23, 2004, Pauls, et al.
U.S. Appl. No. 10/915,024, filed Aug. 10, 2004, Nguyen.
U.S. Appl. No. 10/932,749, filed Sep. 2, 2004, Harris, et al.
U.S. Appl. No. 10/933,705, filed Sep. 3, 2004, Kalman.
U.S. Appl. No. 10/950,072, filed Sep. 24, 2004, Nguyen, et al.
U.S. Appl. No. 10/991,228, filed Nov. 17, 2004, Munoz, Jr., et al.
U.S. Appl. No. 10/991,248, filed Nov. 17, 2004, Munoz, Jr., et al.
U.S. Appl. No. 11/046,043, filed Jan. 28, 2005, Todd, et al.
U.S. Appl. No. 11/046,652, filed Jan. 28, 2005, Todd, et al.
U.S. Appl. No. 11/047,876, filed Jan. 31, 2005, Mang, et al.
U.S. Appl. No. 11/048,417, filed Jan. 31, 2005, Mang, et al.
U.S. Appl. No. 11/049,464, filed Feb. 2, 2005, Mang, et al.
U.S. Appl. No. 11/049,483, filed Feb. 2, 2005, Mange, et al.
U.S. Appl. No. 11/049,600, filed Feb. 2, 2005, Mang, et al.
U.S. Appl. No. 11/049,601, filed Feb. 2, 2005, Mang, et al.
U.S. Appl. No. 11/062,943, filed Feb. 22, 2005, Saini, et al.
U.S. Appl. No. 11/062,956, filed Feb. 22, 2005, Surjaatmadja, et al.
U.S. Appl. No. 11/147,093, filed Jun. 7, 2005, Todd, et al.
U.S. Appl. No. 11/128,060, filed May 12, 2005, Saini.
U.S. Appl. No. 11/127,583, filed May 12, 2005, Saini.
Simmons, et al., *Poly(phenyllactide): Synthesis, Characterization, and Hydrolytic Degradation*, Biomacromolecules, vol. 2, No. 2, 2001 (pp. 658-663).
Yin, et al., *Preparation and Characterization of Substituted Polylactides*, American Chemical Society, vol. 32, No. 23, 1999 (pp. 7711-7718).
Yin, et al., *Synthesis and Properties of Polymers Derived form Substituted Lactic Acids*, American Chemical Society, Ch. 12, 2001 (pp. 147-159).
Cantu, et al, *Laboratory and Field Evaluation of a Combined Fluid-Loss-Control Additive and Gel Breaker for Fracturing Fluids*, SPE 18211, Society of Petroleum Engineers, 1990.
Love, et al, *Selectively Placing Many Fractures in Openhole Horizontal Wells Improves Production*, SPE 50422, Society of Petroleum Engineers, 1998.
McDaniel, et al, *Evolving New Stimulation Process Proves Highly Effective in Level I Dual-Lateral Completion*, SPE 78697, Society of Petroleum Engineers, 2002.
Albertsson, et al, *Aliphatic Polyesters: Systhesis, Properties and Applications*, Advances in Polymer Science, vol. 157, Degradable Aliphatic Polyesters, 2002.
Dechy-Cabaret, et al, *Controlled Ring-Opening Polymerization of Lactide and Glycolide*, American Chemical Society, Chemical Reviews, A-Z, AA-AD, received 2004.
Funkhouser, et al, *Synthetic Polymer Fracturing Fluid for High-Temperature Applications*, SPE 80236, Society of Petroleum Engineers, 2003.
*Chelating Agents*, Encyclopedia of Chemical Technology, vol. 5 (764-795).
Vichaibun, et al, *A New Assay for the Enzymatic Degradation of Polylactic Acid, Short Report*, ScienceAsia, vol. 29, 2003 (pp. 297-300).
Halliburton, *SurgiFrac$^{SM}$ Service, A Quick and Cost-Effective Method to Help Boost Production From Openhole Horizontal Completions*, Halliburton Communications, HO3297, 2002.
Halliburton, *Cobra Frac$^{SM}$ Service, Coiled Tubing Fracturing—Cost-Effective Method for Stimulating Untapped Reserves*, HO2319R, Halliburton Energy Services, 2000.
Halliburton, *CobraJet Frac$^{SM}$ Service, Cost-effective Technology That Can Help Reduce Cost Per BOE Produced, Shorten Cycle Time and Reduce Capex*, Halliburton Communications.

Y. Chiang et al., *Hydrolysis Of Ortho Esters; Further Investigation Of The Factors Which Control The Rate-Determining Step,* Engineering Information, Inc. NY, NY, vol. 105, No. 23 (XP-002322842) Abstract, Nov. 16, 1983.

M. Ahmad, et al., *Ortho Ester Hydrolysis: Direct Evidence For A Three-Stage Reaction Mechanism,* Engineering Information, Inc. NY, NY, vol. 101, No. 10 (XP-002322843) Abstract, May 9, 1979.

Skrabal et al, *The Hydrolysis Rate Of Orthoformic Acid Ethyl Ether,* Chemical Institute of the University of Graz, Jan. 13, 1921, pp. 1-38, Translation, Jan. 13, 1921.

Heller, et al., *Poly(ortho esters)—From Concept to Reality,* Biomacromolecules, vol. 5, No. 5, 2004 (pp. 1625-1632), May 9, 1979.

Schwach-Abdellaoui, et al., *Hydrolysis and Erosion Studies of Autocatalyzed Poly(ortho esters) Containing Lactoyl-Lactyl Acid Dimers,* American Chemical Society, vol. 32, No. 2, 1999 (pp. 301-307).

Ng, et al., *Synthesis and Erosion Studies of Self-Catalyzed Poly(ortho ester)s,* American Chemical Society, vol. 30, No. 4, 1997 (pp. 770-772).

Ng, et al., *Development of a Poly(ortho ester) prototype With A Latent Acid In The Polymer Backbone For 5-fluorouracil Delivery,* Journal of Controlled Release 65 (2000), (pp. 367-374).

Rothen-Weinhold, et al., *Release of BSA from poly(ortho ester) extruded thin strands* Journal of Controlled Release 71, 2001, (pp. 31-37).

Heller, et al., *Poly(ortho ester)s—their development and some recent applications,* European Journal of Pharmaceutics and Biopharmaceutics, 50, 2000, (pp. 121-128).

Heller, et al., *Poly(ortho esters); synthesis, characterization, properties and uses,* Advanced Drug Delivery Reviews, 54, 2002, (pp. 1015-1039).

Heller, et al., *Poly(ortho esters) For The Pulsed and Continuous Delivery of Peptides and Proteins,* Controlled Release and Biomedical Polymers Department, SRI International, (pp. 39-46).

Zignani, et al., *Subconjunctival biocompatibility of a viscous bioerodable poly(ortho ester),* J. Biomed Mater Res, 39, 1998, pp. 277-285.

Toncheva, et al., *Use of Block Copolymers of Poly(Ortho Esters) and Poly (Ethylene Glycol),* Journal of Drug Targeting, 2003, vol. 11(6), pp. 345-353.

Schwach-Abdellaoui, et al., *Control of Molecular Weight For Auto-Catalyzed Poly(ortho ester) Obtained by Polycondensation Reaction,* International Journal of Polymer Anal. Charact., 7: 145-161, 2002, pp. 145-161.

Heller, et al., *Release of Norethindrone from Poly(Ortho Esters),* Polymer Engineering and Science, Mid-Aug. 1981, vol. 21, No. 11 (pp. 727-731).

Cordes, et al., *Mechanism and Catalysis for Hydrolysis of Acetals, Ketals, and Other Esters,* Department of Chemistry, Indiana University, Bloomington, Indiana, Chemical Reviews, 1974, vol. 74, No. 5, pp. 581-603.

Todd, et al., *A Chemcial "Trigger" Useful for Oilfield Applications,* Society of Petroleum Engineers, Inc., SPE 92709, Feb. 4, 2005.

Helminen, "Branched and Crosslinked Resorbable Polymers Based on Lactic Acid, Lactide and—e-Caprolactone," Polymer Technology Publication Series, Espoo 2003, No. 26.

Helminen, et al., "Structure Modifaction and Crosslinking of Methacrylated Polylactide Oligomers," J. App. Poly. Sci. vol. 86, 3616-3624 (2002).

Office Action for U.S. Appl. No. 11/634,319, dated Jun. 16, 2009.

Office Action for U.S. Appl. No. 10/664,126, dated Jul. 22, 2009.

* cited by examiner

TREATMENT FLUIDS AND METHODS OF FORMING DEGRADABLE FILTER CAKES COMPRISING ALIPHATIC POLYESTER AND THEIR USE IN SUBTERRANEAN FORMATIONS

CROSS-REFERENCE TO RELATED APPLICATION

This application is a continuation-in-part of the following U.S. patent applications, which are hereby incorporated by reference for all purposes, and from which priority is claimed pursuant to 35 U.S.C. §120: U.S. patent application Ser. No. 10/832,163, entitled "Improved Treatment Fluids and Methods of Use in Subterranean Formations," filed Apr. 26, 2004, now abandoned; and U.S. patent application Ser. No. 10/664,126 entitled "Improved Subterranean Treatment Fluids and Methods of Treating Subterranean Formations," filed Sep. 17, 2003.

BACKGROUND OF THE INVENTION

The present invention relates to subterranean treatment operations, and more particularly, to improved bridging agents comprising a degradable material, to improved subterranean treatment fluids comprising such improved bridging agents, and to methods of using such improved subterranean treatment fluids in subterranean formations.

A subterranean treatment fluid used in connection with a subterranean formation may be any number of fluids (gaseous or liquid) or mixtures of fluids and solids (e.g., solid suspensions, mixtures and emulsions of liquids, gases and solids) used in subterranean operations. An example of a subterranean treatment fluid is a drilling fluid. Drilling fluids are used, inter alia, during subterranean well-drilling operations to, e.g., cool the drill bit, lubricate the rotating drill pipe to prevent it from sticking to the walls of the well bore, prevent blowouts by serving as a hydrostatic head to counteract the sudden entrance into the well bore of high pressure formation fluids, and also remove drill cuttings from the well bore. Another example of a subterranean treatment fluid is a "drill-in and servicing fluid." "Drill-in and servicing fluids," as referred to herein, will be understood to include fluids placed in a subterranean formation from which production has been, is being, or may be cultivated. For example, an operator may begin drilling a subterranean borehole using a drilling fluid, cease drilling at a depth just above that of a potentially productive formation, circulate a sufficient quantity of a drill-in and servicing fluid through the bore hole to completely flush out the drilling fluid, then proceed to drill into the desired formation using the well drill-in and servicing fluid. Drill-in and servicing fluids often are utilized, inter alia, to minimize damage to the permeability of such formations.

Subterranean treatment fluids generally are aqueous-based or oil-based, and may comprise additives such as viscosifiers (e.g., xanthan) and fluid loss control additives (e.g., starches). Subterranean treatment fluids further may comprise bridging agents, which may aid in preventing or reducing loss of the treatment fluid to, inter alia, natural fractures within the subterranean formation. Calcium carbonate is an example of a conventional bridging agent. In certain circumstances, a bridging agent may be designed to form a filter cake so as to plug off a "thief zone" (a portion of a subterranean formation, most commonly encountered during drilling operations, into which a drilling fluid may be lost). Generally, bridging agents are designed to form fast and efficient filter cakes on the walls of the well bores within the producing formations to minimize potential leak-off and damage. Generally, the filter cakes are removed before hydrocarbons are produced from the formation.

Conventionally, the filter cakes are removed from well bore walls by contacting the filter cake with one or more subsequent fluids. For example, where an aqueous-based treatment fluid comprising bridging agents is used to establish a filter cake, operators conventionally have employed enzymes and oxidizers to remove the viscosifier and fluid loss control additive, and then used an acid, or a delayed-generation acid, to clean up the calcium carbonate bridging agent. The removal of filter cakes established by oil-based treatment fluids, however, is often much more difficult.

When an oil-based treatment fluid comprising bridging agents is placed in a subterranean formation, a filter cake often results that covers the walls of the well bore. Because the fluids that subsequently will be placed in the well bore often will be aqueous-based, an operator ordinarily might prefer to remove this filter cake with an aqueous-based cleanup fluid that may be compatible with the subsequent fluids. However, attempts to remove the filter cake with an aqueous-based cleanup fluid generally have been unsuccessful, due at least in part to the fact that oil and water are immiscible, which may impair the aqueous-based cleanup fluid's ability to clean the filter cake off the well bore walls. Accordingly, operators have attempted to introduce acid into the well bore, to try to dissolve the calcium carbonate bridging agents which are acid-soluble. This method has been problematic, however, because such calcium carbonate bridging agents are generally well-mixed within the filter cake. Multi-stage cleanup operations usually ensue, and may include, in a first stage, the introduction of water-wetting and oil-penetrating surfactants, followed by multiple stages that involve the introduction of an acid solution into the well bore. Additionally, some operators have attempted to use an oil-based treatment fluid having a particular pH to establish a filter cake (which, as noted above, is essentially a water-in-oil emulsion when formed by an oil-based treatment fluid), and followed the oil-based treatment fluid with a cleanup fluid having a pH that is sufficiently different to invert the emulsion (e.g., the filter cake) to become water-external, thereby water-wetting the bridging particles within the filter cake.

These conventional methods have been costly, laborious to perform, and generally have not produced the desired results, largely because the filter cake is not cleaned evenly-rather, the cleanup methods described above generally only achieve "pinpricks" in the filter cake itself. These pinpricks may be problematic because the well bore is typically under hydrostatic pressure from the column of treatment fluid, which may be lost through these pinpricks where the filter cake has been penetrated. Thus, any fluid that subsequently is placed within the well bore may be lost into the formation, as such fluid may follow the path of least resistance, possibly through the pinpricks.

SUMMARY

The present invention relates to subterranean treatment operations, and more particularly, to improved bridging agents comprising a degradable material, to improved subterranean treatment fluids comprising such improved bridging agents, and to methods of using such improved subterranean treatment fluids in subterranean formations.

One embodiment of the present invention provides a method comprising: drilling a well bore in a subterranean formation using a treatment fluid comprising a base fluid, a viscosifier, a fluid loss control additive, and a bridging agent comprising a degradable material that comprises an aliphatic polyester.

Another embodiment of the present invention provides a method comprising: placing a treatment fluid in a subterranean formation, the treatment fluid comprising a base fluid, a viscosifier, a fluid loss control additive, and a bridging agent comprising a degradable material that comprises an aliphatic polyester; and permitting the bridging agent to form a self-degrading filter cake upon a surface in the formation, whereby fluid loss to the formation through the self-degrading filter cake is reduced.

Another embodiment of the present invention provides a method comprising: providing a filter cake in a subterranean formation that comprises a bridging agent that comprises a degradable material that comprises an aliphatic polyester; and permitting the degradable material to degrade.

The features and advantages of the present invention will be readily apparent to those skilled in the art. While numerous changes may be made by those skilled in the art, such changes are within the spirit of the invention.

DESCRIPTION OF PREFERRED EMBODIMENTS

The present invention relates to subterranean treatment operations, and more particularly, to improved bridging agents comprising a degradable material, to improved subterranean treatment fluids comprising such improved bridging agents, and to methods of using such improved subterranean treatment fluids in subterranean formations. While the compositions and methods of the present invention are useful in a variety of subterranean applications, they may be particularly useful in subterranean drilling operations.

The subterranean treatment fluids of the present invention generally comprise a base fluid, a viscosifier, a fluid loss control additive, and a bridging agent of the present invention, the bridging agent comprising a degradable material capable of undergoing an irreversible degradation downhole. Optionally, other additives may be added as desired.

The base fluid may comprise any number of organic fluids. Examples of suitable organic fluids include, but are not limited to, mineral oils, synthetic oils, esters, kerosene, diesel, and the like. Generally, these organic fluids may be referred to generically as "oils." Where a treatment fluid of the present invention comprises one or more of these organic fluids, and is used as a drilling fluid in drilling operations, such drilling fluid may be referred to as an "oil-based fluid" or an "oil-based mud." Generally, any oil in which a water solution of salts can be emulsified may be suitable for use as a base fluid in the treatment fluids of the present invention. Generally, the base fluid may be present in an amount sufficient to form a pumpable treatment fluid. More particularly, the base fluid typically is present in the treatment fluid in an amount in the range of from about 20% to about 99% by volume of the treatment fluid. In certain exemplary embodiments, the base fluid may be present in the treatment fluid in an amount in the range of from about 20% to about 95% by volume of the treatment fluid.

The treatment fluids of the present invention comprise a viscosifier. A broad variety of viscosifiers may be suitable. For example, the viscosifier may be an organophilic clay, a synthetic oil-soluble polymer, or a polymeric fatty acid. An example of a synthetic oil-soluble polymer is commercially available from Halliburton Energy Services, Inc., of Houston, Tex., under the trade name "BARAPAK." An example of a polymeric fatty acid is commercially available from Halliburton Energy Services, Inc., of Houston, Tex., under the trade name "X-VIS." Generally, the viscosifier is present in the treatment fluids of the present invention in an amount sufficient to provide a desired capability for solids suspension. In certain exemplary embodiments, the viscosifier may be present in the treatment fluid in an amount in the range of from about 1 to 20 pounds of viscosifier per barrel of treatment fluid. In certain exemplary embodiments, the viscosifier may be present in the treatment fluid in an amount in the range of from about 2 to about 15 pounds of viscosifier per barrel of treatment fluid.

The treatment fluids of the present invention further comprise a fluid loss control additive. Generally, any fluid loss control additive may be suitable for use in the treatment fluids of the present invention. Examples of suitable fluid loss control additives include, but are not limited to, synthetic oil-soluble polymers, powdered hydrocarbon resins, and organophilic lignite. An example of a synthetic oil-soluble polymer is commercially available from Halliburton Energy Services, Inc., of Houston, Tex., under the trade name "BARAPAK." In certain exemplary embodiments, the fluid loss control additive may be a synthetic oil-soluble copolymer commercially available from Halliburton Energy Services, Inc., under the trade name "ADAPTA." Generally, the fluid loss control additive is present in the treatment fluid in an amount sufficient to provide a desired degree of fluid loss control. In certain exemplary embodiments, the fluid loss control additive is present in the treatment fluid in an amount in the range of from about 1 to about 30 pounds of fluid loss control additive per barrel of treatment fluid. In certain exemplary embodiments, the fluid loss control additive is present in the treatment fluid in an amount in the range of from about 2 to about 20 pounds of fluid loss control additive per barrel of treatment fluid.

The treatment fluids of the present invention further comprise a bridging agent of the present invention that comprises a degradable material capable of undergoing an irreversible degradation downhole. The term "irreversible," as used herein, means that the degradable material once degraded should not recrystallize or reconsolidate while downhole, e.g., the degradable material should degrade in situ but should not recrystallize or reconsolidate in situ. The terms "degradation" or "degradable" refer to both the two relatively extreme cases of hydrolytic degradation that the degradable material may undergo, e.g., bulk erosion and surface erosion, and any stage of degradation in between these two. This degradation can be a result of, inter alia, a chemical or thermal reaction, or a reaction induced by radiation.

The bridging agent of the present invention becomes suspended in the treatment fluid and, as the treatment fluid begins to form a filter cake within the subterranean formation, the bridging agent becomes distributed throughout the resulting filter cake. In certain exemplary embodiments, the filter cake forms upon the face of the formation itself. After the requisite time period dictated by the characteristics of the particular degradable material utilized, the degradable material undergoes an irreversible degradation. This degradation, in effect, causes the degradable material to substantially be removed from the filter cake. As a result, voids are created in the filter cake. Removal of the degradable material from the filter cake allows produced fluids to flow more freely.

Generally, the bridging agent comprising the degradable material is present in the treatment fluids of the present invention in an amount sufficient to assist in creating an efficient filter cake. As referred to herein, the term "efficient filter cake" will be understood to mean a filter cake comprising no material beyond that required to provide a desired level of fluid loss control. In certain embodiments, the bridging agent comprising the degradable material is present in the treatment fluid in an amount ranging from about 0.1% to about 32% by weight. In certain exemplary embodiments, the bridging agent comprising the degradable material is present in the treatment fluid in the range of from about 3% and about 10% by weight. In certain exemplary embodiments, the bridging agent is present in the treatment fluid in an amount sufficient to provide a fluid loss of less than about 15 mL in tests conducted according to the procedures set forth by API Recommended Practice (RP) 13. One of ordinary skill in the art with the benefit of this disclosure will recognize an optimum concentration of degradable material that provides desirable values in terms of enhanced ease of removal of the filter cake at the desired time without undermining the stability of the filter cake during its period of intended use.

Nonlimiting examples of suitable degradable materials that may be used in conjunction with the present invention include, but are not limited to, degradable polymers, hydrated organic or inorganic compounds, and/or mixtures of the two. In choosing the appropriate degradable material, one should consider the degradation products that will result. Also, these degradation products should not adversely affect other operations or components. One of ordinary skill in the art, with the benefit of this disclosure, will be able to recognize when particular components of the treatment fluids of the present invention would be incompatible or would produce degradation products that would adversely affect other operations or components.

As for degradable polymers, a polymer is considered to be "degradable" herein if the degradation is due to, inter alia, chemical and/or radical process such as hydrolysis, oxidation, enzymatic degradation, or UV radiation. The degradability of a polymer depends, at least in part, on its backbone structure. For instance, the presence of hydrolyzable and/or oxidizable linkages in the backbone often yields a material that will degrade as described herein. The rates at which such polymers degrade are dependent on, inter alia, the type of repetitive unit, composition, sequence, length, molecular geometry, molecular weight, morphology (e.g., crystallinity, size of spherulites, and orientation), hydrophilicity, hydrophobicity, surface area, and additives. The manner in which the polymer degrades also may be affected by the environment to which the polymer is subjected (e.g., temperature, presence of moisture, oxygen, microorganisms, enzymes, pH, and the like).

Suitable examples of degradable polymers that may be used in accordance with the present invention include, but are not limited to, those described in the publication of Advances in Polymer Science, Vol. 157 entitled "Degradable Aliphatic Polyesters" edited by A. C. Albertsson, pages 1-138. Specific examples include homopolymers, random, block, graft, and star- and hyper-branched aliphatic polyesters. Such suitable polymers may be prepared by polycondensation reactions, ring-opening polymerizations, free radical polymerizations, anionic polymerizations, carbocationic polymerizations, and coordinative ring-opening polymerization for, e.g., lactones, and any other suitable process. Specific examples of suitable polymers include, but are not limited to, polysaccharides such as dextran or cellulose; chitin; chitosan; proteins; orthoesters (also known as "orthoethers"); aliphatic polyesters; poly(lactide); poly(glycolide); poly(ϵ-caprolactone); poly(hydroxybutyrate); poly(anhydrides); aliphatic polycarbonates; poly (orthoesters) (also known as "poly(orthoethers)"); poly (amino acids); poly(ethylene oxide); and polyphosphazenes. Of these suitable polymers, aliphatic polyesters and polyanhydrides may be preferred in many situations.

Suitable aliphatic polyesters have the general formula of repeating units shown below:

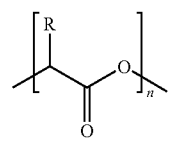

Formula I where n is an integer between 75 and 10,000 and R is selected from the group consisting of hydrogen, alkyl, aryl, alkylaryl, acetyl, heteroatoms, and mixtures thereof. Of the suitable aliphatic polyesters, poly(lactide) is preferred. Poly(lactide) is synthesized either from lactic acid by a condensation reaction or more commonly by ring-opening polymerization of cyclic lactide monomer. Since both lactic acid and lactide can achieve the same repeating unit, the general term poly(lactic acid) as used herein refers to writ of formula I without any limitation as to how the polymer was made (such as from lactides, lactic acid, or oligomers), and without reference to the degree of polymerization or level of plasticization.

The lactide monomer exists generally in three different forms: two stereoisomers L- and D-lactide and racemic D,L-lactide (meso-lactide). The oligomers of lactic acid, and oligomers of lactide are defined by the formula:

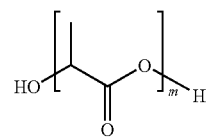

Formula II where m is an integer: $2 \leq m \leq 75$. In certain exemplary embodiments, m is an integer: $2 \leq m \leq 10$. These limits correspond to number average molecular weights below about 5,400 and below about 720, respectively. The chirality of the lactide units provides a means to adjust, inter alia, degradation rates, as well as physical and mechanical properties. Poly(L-lactide), for instance, is a semicrystalline polymer with a relatively slow hydrolysis rate. This could be desirable in applications of the present invention where a slower degradation of the degradable material is desired. Poly(D,L-lactide) may be a more amorphous polymer with a resultant faster hydrolysis rate. This may be suitable for other applications where a more rapid degradation may be appropriate. The stereoisomers of lactic acid may be used individually or combined in accordance with the present invention. Additionally, they may be copolymerized with, for example, glycolide or other monomers like ϵ-caprolactone, 1,5-dioxepan-2-one, trimethylene carbonate, or other suitable monomers to obtain polymers with different properties or degradation times. Additionally, the lactic acid stereoisomers can be modified by blending high and low molecular weight polylactide or by blending polylactide with other polyesters.

Plasticizers may be present in the polymeric degradable materials of the present invention. The plasticizers may be present in an amount sufficient to provide the desired characteristics, for example, (a) more effective compatibilization of the melt blend components, (b) improved processing characteristics during the blending and processing steps, and (c) control and regulation of the sensitivity and degradation of the polymer by moisture. Suitable plasticizers include, but are not limited to, derivatives of oligomeric lactic acid, selected from the group defined by the formula:

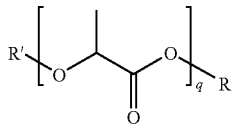

Formula III where R is a hydrogen, alkyl, aryl, alkylaryl, acetyl, heteroatom, or a mixture thereof and R is saturated, where R' is a hydrogen, alkyl, aryl, alkylaryl, acetyl, heteroatom, or a mixture thereof and R' is saturated, where R and R' cannot both be hydrogen, where q is an integer: $2 \leq q \leq 75$; and mixtures thereof. In certain exemplary embodiments, q is an integer: $2 \leq q \leq 10$. As used herein, the term "derivatives of oligomeric lactic acid" includes derivatives of oligomeric lactide.

Aliphatic polyesters useful in the present invention may be prepared by substantially any of the conventionally known manufacturing methods, including, but not limited to, those described in U.S. Pat. Nos. 6,323,307; 5,216,050; 4,387,769; 3,912,692; and 2,703,316, the relevant disclosures of which are incorporated herein by reference. In addition to the other qualities above, the plasticizers may enhance the degradation rate of the degradable polymeric materials.

Polyanhydrides are another type of particularly suitable degradable polymer useful in the present invention. Examples of suitable polyanhydrides include poly(adipic anhydride), poly(suberic anhydride), poly(sebacic anhydride), and poly(dodecanedioic anhydride). Other suitable examples include, but are not limited to, poly(maleic anhydride) and poly(benzoic anhydride).

The physical properties of degradable polymers depend on several factors, including, inter alia, the composition of the repeat units, flexibility of the chain, presence of polar groups, molecular mass, degree of branching, crystallinity, and orientation. For example, short-chain branches reduce the degree of crystallinity of polymers while long-chain branches lower the melt viscosity and impart, inter alia, elongational viscosity with tension-stiffening behavior. The properties of the material utilized further can be tailored by blending, and copolymerizing it with another polymer, or by changing the macromolecular architecture (e.g., hyper-branched polymers, star-shaped, or dendrimers, etc.). The properties of any such suitable degradable polymers (e.g., hydrophobicity, hydrophilicity, rate of degradation, etc.) can be tailored by introducing select functional groups along the polymer chains. For example, poly(phenyllactide) will degrade at about ⅕th of the rate of racemic poly(lactide) at a pH of 7.4 at 55° C. One of ordinary skill in the art, with the benefit of this disclosure, will be able to determine the appropriate functional groups to introduce to the polymer chains to achieve the desired physical properties of the degradable polymers.

In certain exemplary embodiments, the bridging agents used in the treatment fluids of the present invention comprise a degradable aliphatic polyester and a hydrated organic or inorganic compound. Examples of such hydrated organic or inorganic compounds include, but are not limited to, sodium acetate trihydrate, L-tartaric acid disodium salt dihydrate, sodium citrate dihydrate, sodium tetraborate decahydrate, sodium hydrogen phosphate heptahydrate, sodium phosphate dodecahydrate, amylose, starch-based hydrophilic polymers, or cellulose-based hydrophilic polymers. In certain exemplary embodiments, the degradable aliphatic polyester is poly(lactic acid). In certain exemplary embodiments, the hydrated organic or inorganic compound is sodium acetate trihydrate. In certain exemplary embodiments, the lactide units of the aliphatic polyester and releasable water from the hydrated organic or inorganic compound may be present in stoichiometric amounts. In certain exemplary embodiments, the bridging agent comprises a degradable aliphatic polyester and a hydrated organic or inorganic compound in combination with a bridging agent that comprises calcium carbonate in an amount in the range of about 1 pound to about 100 pounds of calcium carbonate per barrel of treatment fluid.

Optionally, the degradable materials used in the present invention may comprise one or more crosslinked degradable polymers. In some embodiments, it may be desirable to include a crosslinked degradable polymer, among other purposes, to increase the impact strength, tensile strength, compressive stength, high temperature dimensional stability, creep resistance, and modulus of the degradable material.

Crosslinked degradable polymers suitable for use in the present invention may comprise any crosslinked polymer known in the art that is capable of undergoing an irreversible degradation downhole. By way of example and not limitation, certain crosslinked degradable polymers may be prepared via a two-step process that involves (1) polymerizing and/or functionalizing a degradable polymer to form a functionalized degradable polymer and (2) crosslinking the molecules of the functionalized degradable polymer. Examples of processes that may be used to prepare crosslinked degradable polymers that may be suitable for use in the present invention are described in an article entitled "Structure Modification and Crosslinking of Methacrylated Polylactide Oligomers" by Antti O. Helminen et al. in *The Journal of Applied Polymer Science*, Vol. 86, pages 3616-3624 (2002), and WIPO Patent Application Publication No. WO 2006/053936 by Jukka Seppälä, the relevant disclosures of which are herein incorporated by reference.

For example, a degradable polymer (e.g., a polyester or poly(lactide)) may be polymerized to include different numbers of hydroxyl functional groups, or an existing degradable polymer may be functionalized with different numbers of hydroxyl functional groups, to form a functionalized degradable polymer having one or more carbon-carbon double bonds. These functional groups may be provided via reaction of the degradable polymer with a functionalizing agent that may comprise one or more diols, polyfunctional alcohols, dicarboxylic acids, polyfunctional carboxylic acids, anhydrides, derivatives thereof, and combinations thereof. The choice of a particular functionalizing agent used may depend on several factors that will be recognized by a person of ordinary skill in the art with the benefit of this disclosure, including, but not limited to, the molecular structure and/or size of the functionalized degradable polymer desired. After at least one functionalized degradable polymer is generated, a crosslinking initiator and/or energy source may be used to form a radical at the double-bond site, and these radicals formed on different molecules of the functionalized degradable polymer may interact with each other so as to form one or more crosslinks between them. The crosslinking initiator may comprise any substance that is capable of forming a radical on the functionalized degradable polymer. Examples of suitable crosslinking initiators may include organic peroxy compounds (e.g., diazyl peroxides, peroxy esters, peroxy dicarbonates, monoperoxy carbonates, diperoxy ketals, dialkyl peroxides, sulfonyl peroxides, ketone peroxides, and peroxy carboxylic acids), inorganic peroxides (e.g., hydrogen peroxide, oxygen, ozone, and azo compounds), redox initiators, derivatives thereof, and combinations thereof. Suitable energy sources may comprise a heat source, a light source, a radiation source, and combinations thereof. The energy sources suitable for use in the present invention may vary by numerous different properties and settings, including but not limited to, wavelength of light produced, intensity of light produced, amount of heat produced, and the like. In certain embodiments, the light source may comprise an instrument that is capable of emitting blue light (e.g., light having a wavelength of about 400 nm to about 500 nm).

In certain embodiments of the present invention where this method of preparing the crosslinked degradable polymer is used, the crosslinking initiator may be formulated to remain inactive until it is "activated" by, among other things, certain conditions in the fluid (e.g., pH, temperature, etc.) and/or contact with some other substance. In some embodiments, the crosslinking initiator may be delayed by encapsulation with a coating that delays its release until a desired time or place. The choice of a particular crosslinking initiator and/or energy source will be governed by several considerations that will be recognized by one skilled in the art, including but not limited to the following: the type of functionalized degradable polymer included, the molecular weight of the functionalized degradable polymer, the pH of the treatment fluid, temperature, and/or the desired time at which to crosslink the degradable polymer. The exact type and amount of crosslinking initiator and/or the particular parameters of the energy source used depends upon the specific degradable polymer to be crosslinked, formation temperature conditions, and other factors recognized by those individuals skilled in the art, with the benefit of this disclosure.

Optionally, a crosslinking accelerator may be used, inter alia, to increase the rate at which the functionalized degradable polymers form crosslinks. Examples of suitable crosslinking accelerators that may be used include, but are not limited to, metal compounds (e.g., cobalt compounds), organic amines, and the like. The choice of whether to use a crosslinking accelerator, and, if used, the exact type and amount of the crosslinking accelerator is within the ability of those individuals skilled in the art, with the benefit of this disclosure.

The choice of degradable material can depend, at least in part, on the conditions of the well, e.g., well bore temperature. For instance, lactides have been found to be suitable for lower temperature wells, including those within the range of about 60° F. to about 150° F., and polylactides have been found to be suitable for well bore temperatures above this range. Hydrated organic or inorganic compounds also may be suitable for higher temperature wells.

Also, we have found that a preferable result is achieved if the degradable material degrades slowly over time as opposed to instantaneously. The slow degradation of the degradable material helps, inter alia, to maintain the stability of the filter cake. The time required for degradation of the degradable material may depend on factors including, but not limited to, the temperature to which the degradable material is exposed, as well as the type of degradable material used. In certain exemplary embodiments, a bridging agent of the present invention comprises a degradable material that does not begin to degrade until at least about 12 to about 24 hours after its placement in the subterranean formation. Certain exemplary embodiments of the treatment fluids of the present invention may comprise degradable materials that may begin degrading in less than about 12 hours, or that may not begin degrading until after greater than about 24 hours.

The specific features of the degradable material may be modified so as to maintain the filter cake's filtering capability when the filter cake is intact while easing the removal of the filter cake when such removal becomes desirable. In certain exemplary embodiments, the degradable material has a particle size distribution in the range of from about 0.1 micron to about 1.0 millimeters. Whichever degradable material is utilized, the bridging agents may have any shape, including, but not limited to, particles having the physical shape of platelets, shavings, flakes, ribbons, rods, strips, spheroids, toroids, pellets, tablets, or any other physical shape. One of ordinary skill in the art with the benefit of this disclosure will recognize the specific degradable material and the preferred size and shape for a given application.

The filter cake formed by the treatment fluids of the present invention is a "self-degrading" filter cake as defined herein. As referred to herein, the term "self-degrading filter cake" will be understood to mean a filter cake that may be removed without the assistance of a separate "clean up" solution or "breaker" through the well bore, wherein the purpose of such clean up solution or breaker is solely to degrade the filter cake. Though the filter cakes formed by the treatment fluids of the present invention are "self-degrading" filter cakes, an operator nevertheless occasionally may elect to circulate a separate clean up solution or breaker through the well bore under certain circumstances, such as when the operator desires to enhance the rate of degradation of the filter cake.

Optionally, the treatment fluids of the present invention also may comprise additives such as weighting agents, emulsifiers, salts, filtration control agents, pH control agents, and the like. Weighting agents are typically heavy minerals such as barite, ilmenite, calcium carbonate, iron carbonate, or the like. Suitable salts include, but are not limited to, salts such as calcium chloride, potassium chloride, sodium chloride, and sodium nitrate. Examples of suitable emulsifiers include polyaminated fatty acids, concentrated tall oil derivatives, blends of oxidized tall oil and polyaminated fatty acids, and the like. Examples of suitable polyaminated fatty acids are commercially available from Halliburton Energy Services, Inc., of Houston, Tex., under the trade names "EZMUL" and "SUPERMUL." An example of a suitable concentrated tall oil derivative is commercially available from Halliburton Energy Services, Inc., of Houston, Tex., under the trade name "FACTANT." Examples of suitable blends of oxidized tall oil and polyaminated fatty acids are commercially available from Halliburton Energy Services, Inc., of Houston, Tex., under the trade names "INVERMUL®" and "LE MUL." Examples of suitable filtration control agents include lignites, modified lignites, powdered resins, and the like. An example of a suitable lignite is commercially available from Halliburton Energy Services, Inc., of Houston, Tex., under the trade name "CARBONOX." An example of a suitable modified lignite is commercially available from Halliburton Energy Services, Inc., of Houston, Tex., under the trade name "BARANEX." An example of a suitable powdered resin is commercially available from Halliburton Energy Services, Inc., of Houston, Tex., under the trade name "BARABLOK." Examples of suitable pH control agents include, but are not limited to, calcium hydroxide, potassium hydroxide, sodium hydroxide, and the like. In certain exemplary embodiments, the pH control agent is calcium hydroxide.

In an exemplary embodiment of a method of the present invention, a treatment fluid of the present invention may be used as a drilling fluid in a subterranean formation, e.g., by circulating the drilling fluid while drilling a well in contact with a drill bit and a subterranean formation. Accordingly, an exemplary method of the present invention comprises the step of drilling a well bore in a subterranean formation using a treatment fluid comprising a base fluid, a viscosifier, a fluid loss control additive, and a bridging agent that comprises a degradable material. Additional steps may include, inter alia, the step of forming a filter cake in the well bore, and the step of permitting the filter cake to degrade.

Another example of a method of the present invention comprises the steps of: placing a treatment fluid in a subterranean formation, the treatment fluid comprising a base fluid, a viscosifier, a fluid loss control additive, and a bridging agent comprising a degradable material; and permitting the bridging agent to form a self-degrading filter cake upon a surface within the formation, whereby fluid loss to the formation through the self-degrading filter cake is reduced. Another example of a method of the present invention is a method of degrading a filter cake in a subterranean formation, the filter cake having been deposited therein by a treatment fluid comprising a bridging agent, comprising the steps of utilizing a bridging agent comprising a degradable material and permitting the degradable material to degrade.

An example of a treatment fluid of the present invention comprises 68.9% ACCOLADE BASE by weight, 20.1% water by weight, 3% LE SUPERMUL by weight, 1% ADAPTA by weight, and 7% calcium chloride by weight.

To facilitate a better understanding of the present invention, the following examples of certain aspects of some embodiments are given. In no way should the following examples be read to limit, or define, the entire scope of the invention.

EXAMPLE 1

A sample drilling fluid was prepared by adding 80 pounds of calcium carbonate to a barrel of a nonaqueous-based fluid commercially available under the trade name "ACCOLADE," from Halliburton Energy Services, Inc., of Houston, Tex. The sample drilling fluid was tested using a Model 90B dynamic filtration system that is commercially available from Fann Instruments, Inc., of Houston, Tex. The sample drilling fluid was circulated through a hollow cylindrical core within the Model 90B, at 100 psi differential pressure and agitated at a setting of 100 sec−1. Filtrate was permitted to leak outwards through the core, thereby building a filter cake on the inside of the core over a time period of 4.5 hours. Next, the sample drilling fluid was displaced from the core and replaced with a conventional breaker solution comprising from 1% to 3% acetic acid by weight. In one test run, the conventional breaker solution comprised 1% acetic acid; in another test run, the conventional breaker solution comprised 3% acetic acid. The conventional breaker solution was permitted to remain in the core, in contact with the filter cake, under 100 psi differential pressure, without stirring. For each test run, the conventional breaker solution fully penetrated the filter cake in about 30 minutes, determined by observation of rapid fluid loss through the core, triggering termination of the test. This simulates, inter alia, the effect of the conventional breaker solution in a subterranean formation, wherein the conventional breaker solution in the well bore would be lost into the formation upon breakthrough of the filter cake.

Upon inspection of the filter cake, the penetration was visually observed to have occurred through tiny "pin pricks" within the filter cake, e.g., the conventional breaker solution did not achieve significant clean up of the filter cake, but rather, penetrated through only a very small area. In practice, such breakthrough would likely be undesirable, because the conventional breaker solution would penetrate the filter cake and be lost into the formation through such pinpricks, yet the vast majority of the filter cake would remain unaffected, thereby potentially blocking subsequent production of hydrocarbons from the formation. Accordingly, the above example demonstrates, inter alia, the limitations of conventional drilling fluids and conventional breaker solutions.

EXAMPLE 2

A white, solid, degradable composite material of the present invention comprising polylactic acid and sodium acetate trihydrate was placed in a test cell at 250° F. and covered in mineral oil. The material was maintained at 250° F. for about 24 hours, during which time a yellow liquid layer of the degraded composite formed at the base of the cell. This example demonstrates, inter alia, that the degradable materials used in exemplary embodiments of the bridging agents of the present invention may be degraded by heat alone, apart from contact with any external degrading agent.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method comprising:
 drilling a well bore in a subterranean formation using a treatment fluid comprising a base fluid, a viscosifier, a fluid loss control additive, and a bridging agent comprising a degradable material that comprises an aliphatic polyester.

2. The method of claim 1 further comprising the step of permitting the bridging agent to form a filter cake in the well bore.

3. The method of claim 2 further comprising the step of permitting the filter cake to degrade.

4. The method of claim 1 wherein the degradable material further comprises a compound that is hydrated organic or inorganic compound.

5. The method of claim 4 wherein the hydrated organic or inorganic compound comprises sodium acetate trihydrate, L-tartaric acid disodium salt dihydrate, sodium citrate dihydrate, sodium tetraborate decahydrate, sodium hydrogen phosphate heptahydrate, sodium phosphate dodecahydrate, amylose, a starch-based hydrophilic polymer, or a cellulose-based hydrophilic polymer.

6. The method of claim 4 wherein the aliphatic polyester is present in the degradable material in a stoichiometric amount.

7. The method of claim 4 wherein the hydrated organic or inorganic compound is present in the degradable material in a stoichiometric amount.

8. The method of claim 1 wherein the viscosifier is selected from the group consisting of organophilic clays, synthetic oil-soluble polymers, polymeric fatty acids, and combinations thereof.

9. The method of claim 1 wherein the viscosifier is present in the treatment fluid in an amount in the range of from about 1 to about 20 pounds viscosifier per barrel of treatment fluid.

10. The method of claim 1 wherein the fluid loss control additive comprises a synthetic oil-soluble polymer, a powdered hydrocarbon resin, or organophilic lignite.

11. The method of claim 1 wherein the bridging agent is present in the treatment fluid in an amount in the range of from about 0.1% to about 32% by weight of the treatment fluid.

12. The method of claim 1 wherein the aliphatic polyester is an orthoether or a poly(orthoether).

13. The method of claim 1 wherein the degradable material further comprises a crosslinked degradable polymer.

14. The method of claim 1 wherein the degradable material further comprises a plasticizer or a stereoisomer of a poly(lactide).

15. A method comprising:
placing a treatment fluid in a subterranean formation, the treatment fluid comprising
    a base fluid,
    a viscosifier,
    a fluid loss control additive, and
    a bridging agent comprising a degradable material that comprises an aliphatic polyester;
permitting the bridging agent to form a self-degrading filter cake upon a surface in the formation, whereby fluid loss to the formation through the self-degrading filter cake is reduced.

16. The method of claim 15 wherein the aliphatic polyester is an orthoether or a poly(orthoether).

17. The method of claim 15 wherein the degradable material further comprises a crosslinked degradable polymer.

18. A method comprising:
providing a filter cake in a subterranean formation that comprises a bridging agent that comprises a degradable material that comprises an aliphatic polyester;
permitting the degradable material to degrade.

19. The method of claim 18 wherein the aliphatic polyester is an orthoether or a poly(orthoether).

20. The method of claim 18 wherein the degradable material further comprises a crosslinked degradable polymer.

* * * * *